United States Patent
Benz et al.

(10) Patent No.: US 9,010,081 B2
(45) Date of Patent: Apr. 21, 2015

(54) COMBINED CYCLE PLANT INCLUDING CHILLED AMMONIA BASED CO$_2$ CAPTURE UNIT AND UTILIZING SYSTEM PRODUCED NITRIC ACID

(75) Inventors: Eribert Benz, Birmenstorf (CH); Gian-Luigi Agostinelli, Zürich (CH); Andreas Brautsch, Würenlingen (CH); Gisbert Wolfgang Kaefer, Birmenstorf (CH); Felix Güthe, Basel (CH)

(73) Assignee: Alstom Technology Ltd., Baden (CH)

( * ) Notice: Subject to any disclaimer, the term of this patent is extended or adjusted under 35 U.S.C. 154(b) by 527 days.

(21) Appl. No.: 13/273,298

(22) Filed: Oct. 14, 2011

(65) Prior Publication Data

US 2012/0090328 A1   Apr. 19, 2012

(30) Foreign Application Priority Data

Oct. 19, 2010  (EP) ..................... 10188046

(51) Int. Cl.
*F02C 6/00*   (2006.01)
*F02G 3/00*   (2006.01)
(Continued)

(52) U.S. Cl.
CPC .............. *B01D 53/1431* (2013.01); *F02C 3/34* (2013.01); *Y02E 20/185* (2013.01); *B01D 53/002* (2013.01); *B01D 53/1406* (2013.01); *B01D 53/1475* (2013.01); *B01D 53/56* (2013.01); *B01D 53/58* (2013.01); *B01D 53/75* (2013.01);
(Continued)

(58) Field of Classification Search
CPC .............................. Y02C 20/10; Y02E 20/185

USPC ........................... 60/39.182, 39.5, 39.52, 783
See application file for complete search history.

(56) References Cited

U.S. PATENT DOCUMENTS 2,128,527 A * 8/1938 Fischer ...................... 423/393
4,272,953 A * 6/1981 Rice ............................ 60/774
(Continued)

FOREIGN PATENT DOCUMENTS

DE     4335136 A1    4/1994
JP     2010530490    9/2010
(Continued)

OTHER PUBLICATIONS

Japanese Office Action dated Sep. 8, 2014 for JP Patent Application Serial No. 2011-228776 (Japanese).
(Continued)

*Primary Examiner* — William H Rodriguez
*Assistant Examiner* — Rene Ford
(74) *Attorney, Agent, or Firm* — Buchanan Ingersoll & Rooney PC

(57) ABSTRACT

A power plant includes a gas turbine unit adapted to feed flue gases into a boiler of a steam turbine unit, to be then diverted into a recirculated flow and discharged flow. The recirculated flow is mixed with fresh air forming a mixture that is fed into a gas turbine unit compressor. The discharged flow is fed into a CO$_2$ capture unit that is an amine based or chilled ammonia based CO$_2$ capture unit. A cooler for the flue gases can be configured as a shower cooler located upstream of the CO$_2$ capture unit. The plant can also include a washing unit to neutralize ammonia drawn by the flue gases that can be fed with nitric acid gathered at the cooler.

14 Claims, 2 Drawing Sheets

(51) Int. Cl.
  *F02G 1/00* (2006.01)
  *F02C 7/08* (2006.01)
  *B01D 53/14* (2006.01)
  *B01D 53/00* (2006.01)
  *F01K 17/04* (2006.01)
  *F01K 23/10* (2006.01)
  *F23C 9/00* (2006.01)
  *F23J 15/04* (2006.01)
  *F23J 15/06* (2006.01)
  *F02C 3/34* (2006.01)
  *B01D 53/56* (2006.01)
  *B01D 53/58* (2006.01)
  *B01D 53/75* (2006.01)

(52) U.S. Cl.
  CPC ..... *B01D2251/102* (2013.01); *B01D 2251/104* (2013.01); *B01D 2251/504* (2013.01); *B01D 2251/506* (2013.01); *B01D 2252/102* (2013.01); *B01D 2252/103* (2013.01); *B01D 2252/204* (2013.01); *B01D 2257/404* (2013.01); *B01D 2257/406* (2013.01); *B01D 2257/504* (2013.01); *F01K 17/04* (2013.01); *F01K 23/10* (2013.01); *F23C 9/00* (2013.01); *F23J 15/04* (2013.01); *F23J 15/06* (2013.01); *F23J 2215/50* (2013.01); *F23J 2217/50* (2013.01); *Y02C 10/04* (2013.01); *Y02C 10/06* (2013.01); *Y02E 20/16* (2013.01); *Y02E 20/363* (2013.01)

(56) References Cited

U.S. PATENT DOCUMENTS

| | | | | |
|---|---|---|---|---|
| 4,285,830 | A * | 8/1981 | Muller | 588/19 |
| 4,434,613 | A * | 3/1984 | Stahl | 60/784 |
| 5,517,818 | A | 5/1996 | Leithner | |
| 6,637,183 | B2 * | 10/2003 | Viteri et al. | 60/39.182 |
| 6,951,111 | B2 * | 10/2005 | Chen | 60/775 |
| 7,559,977 | B2 * | 7/2009 | Fleischer et al. | 95/236 |
| 2002/0043063 | A1 * | 4/2002 | Kataoka et al. | 60/39.182 |
| 2007/0034171 | A1 * | 2/2007 | Griffin et al. | 122/479.1 |
| 2009/0101012 | A1 | 4/2009 | Gal et al. | |
| 2009/0218821 | A1 * | 9/2009 | ElKady et al. | 290/52 |
| 2009/0277363 | A1 * | 11/2009 | Shibata et al. | 110/186 |
| 2011/0138766 | A1 * | 6/2011 | ElKady et al. | 60/39.24 |
| 2012/0000175 | A1 * | 1/2012 | Wormser | 60/39.12 |

FOREIGN PATENT DOCUMENTS

| | | | | |
|---|---|---|---|---|
| WO | | 9848159 | 10/1998 | |
| WO | | 2010072710 A2 | 7/2010 | |
| WO | WO 2010072729 | A2 * | 7/2010 | F01K 23/10 |

OTHER PUBLICATIONS

Japanese Office Action dated Sep. 8, 2014 for JP Patent Application Serial No. 2011-228776 (English).

* cited by examiner

COMBINED CYCLE PLANT INCLUDING CHILLED AMMONIA BASED $CO_2$ CAPTURE UNIT AND UTILIZING SYSTEM PRODUCED NITRIC ACID

RELATED APPLICATION

The present application hereby claims priority under 35 U.S.C. Section 119 to European Patent application number 10188046.6, filed Oct. 19, 2010, the entire contents of which are hereby incorporated by reference.

FIELD OF INVENTION

The present invention relates to a power plant, in particular to a power plant with flue gas recirculation and a $CO_2$ capture unit.

BACKGROUND

With reference to FIG. 1, WO 2010/072710 discloses a power plant having a gas turbine unit 1 that comprises a compressor 2, a combustion chamber 3 and a turbine 4.

A mixture 6 comprising fresh air 7 coming from the environment is fed into the compressor 2 and flue gases 8 (deriving from the combustion of the mixture 6 with a fuel within the combustion chamber 3) emerge from the turbine 4.

The flue gases 8, which typically have a high temperature, are fed into a boiler 9 of a steam turbine unit 10; within the boiler 9 the flue gases 8 transfer heat to the water of the steam unit 10.

From the boiler 9, the flue gases 8 are split into a recirculated flow 12, that is cooled in a cooler 18 and mixed to the fresh air 7 to form the mixture 6 that is fed into the compressor 2, and a discharged flow 13, that is cooled in a cooler 19 and is then fed into a $CO_2$ capture unit 14 to be then discharged into the atmosphere via 15; in contrast the $CO_2$ that is captured in the $CO_2$ capture unit 14 is stored in 16.

Different types of methods of $CO_2$ capture are known; in the following some of them are briefly cited.

First method types include separation with solvents or sorbents. Among these methods, the method using amine (solvent) is the oldest; is was developed for gas stream having different conditions and features from those of a power plant; in particular this method was developed in connection with the oil industry in which typically a chemically reducing gas stream is treated; in contrast flue gases from a gas turbine have typically oxidising properties. Methods involving sorbents require the gas stream to flow through the adsorbent material at high pressure; regeneration occurs by lowering the pressure (Pressure Swing Adsorption) or increasing the temperature (Temperature Swing Adsorption).

Second method types include gas separation with membranes; different kind of membranes can be used, such as for example porous membranes, zeolites, polymeric membranes, and so on.

Third method types include cryogenic separation, involving gas stream cooling and condensation.

Therefore it is clear that a number of different possibilities are available to implement the $CO_2$ capture method.

SUMMARY

The present disclosure is directed to a power plant including a gas turbine unit adapted to feed flue gases into a boiler of a steam turbine unit. The flue gases are then diverted into a recirculated flow that is mixed with fresh air forming a mixture that is fed into a gas turbine unit compressor; and a discharged flow that is fed into a $CO_2$ capture unit. The $CO_2$ capture unit is an amine based or chilled ammonia based $CO_2$ capture unit.

The disclosure is also directed to a method for operating a power plant including a gas turbine unit adapted to feed flue gases into a boiler of a steam turbine unit. The method includes diverting the flue gases into a recirculated flow and a discharged flow, mixing the recirculated flow with fresh air forming a mixture. The method also includes feeding the mixture into a gas turbine unit compressor and feeding the discharged flow into a $CO_2$ capture unit. The $CO_2$ capture unit is operated as an amine based or chilled ammonia based $CO_2$ capture unit.

BRIEF DESCRIPTION OF THE DRAWINGS

Further characteristics and advantages of the invention will be more apparent from the description of a preferred but non-exclusive embodiment of the power plant, illustrated by way of non-limiting example in the accompanying drawings, in which.

DETAILED DESCRIPTION OF THE PREFERRED EMBODIMENTS

Introduction to the Embodiments

The technical aim of the present invention therefore includes providing a power plant having selected $CO_2$ capture units allowing a synergic operation within the power plant.

In particular the power plant has a gas turbine unit, a steam turbine unit, a $CO_2$ capture unit and also implements flue gas recirculation, wherein all the units constituting the power plant and the recirculation cooperate to achieve a synergic effect that allows low plant and/or operating costs.

The technical aim, together with these and further aspects, are attained according to the invention by providing a power plant in accordance with the accompanying claims.

DETAILED DESCRIPTION

Figure 1:
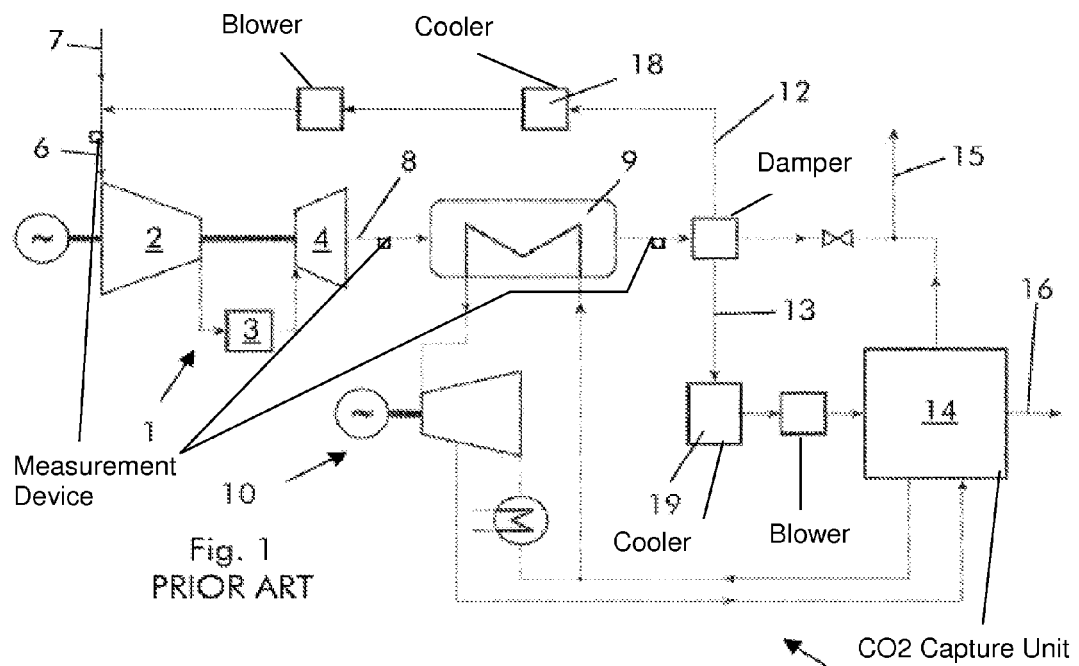
FIG. 1 is a schematic view of a traditional power plant.
Figure 2:
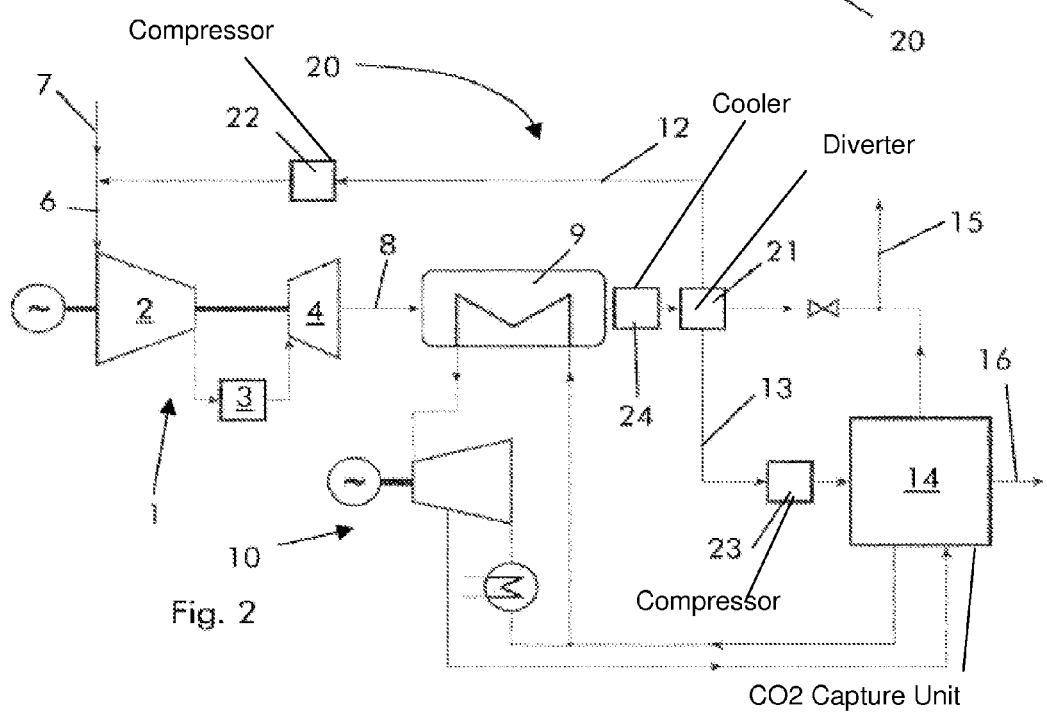
FIG. 2 is a schematic view of a power plant in an embodiment of the invention.

The power plant has the same features already described above; the description of the plant is therefore not repeated in the following and only the most relevant components are cited; in particular in FIGS. 2 and 3 the same references used in FIG. 1 indicate equal or similar components.

The power plant 20 comprises a gas turbine unit 1 whose flue gases 8 are fed into a boiler 9 (any kind of boiler is possible, for example a reheat boiler) of a steam turbine unit 10, to be then diverted (via a diverter 21) into a recirculated flow 12 that is mixed to fresh air 7 forming a mixture 6 that is fed into the gas turbine unit compressor 2, and a discharged flow 13 that is fed into a $CO_2$ capture unit 14. In FIG. 2 references 22, 23 indicate compressors or fans that help flow circulation.

Advantageously, the $CO_2$ capture unit 14 is an amine based or chilled ammonia based $CO_2$ capture unit.

The combination of these elements proved to have a synergic effect, in that all of them contribute to reduce the total costs of the plant and operation.

In fact, the flue gas recirculation allows the $CO_2$ amount within the flue gases to be increased, this lets the size of the $CO_2$ capture unit 14 through which the flue gases 8 has to pass through to be reduced when compared to the size theoretically needed without flue gas recirculation. In addition, with a $CO_2$ capture unit 14 being an amine or chilled ammonia unit, a reduction of the regeneration costs was ascertained, thanks to the increased $CO_2$ concentration within the flue gases.

Upstream of the $CO_2$ capture unit 14, a cooler 24 is provided. Preferably, the cooler 24 is provided downstream of the boiler 9 and upstream of the diverter 21.

Advantageously, the cooler 24 is a shower cooler, i.e. a cooler wherein the flue gases rise from the bottom of a cooler casing and a cooling liquid (typically water) falls from the top of it.

The particular position of the cooler upstream of the diverter 21 allows a further cost reduction, since notwithstanding its greater size, only one cooler is needed. The particular type of cooler selected (shower cooler) allows treatment of a large amount of flue gases, with a combined cooling and filtering effect (i.e. in addition to being cooled, particles that could be generated during the combustion process are removed from the flue gases).

Typically, the flue gases 8 include NO and $NO_2$, which are naturally generated during combustion. Since strict limits are provided for these components, their emissions should be limited by avoiding their generation during combustion and/or removing them before the flue gases 8 are discharged into the environment.

Since $NO_2$ is known to be soluble in water to form nitric acid $HNO_3$ according to a reaction:

$$3NO_2 + H_2O \rightarrow 2HNO_3 + NO$$

the cooler 24 can be advantageously designed to remove a large amount of $NO_2$ from the flue gases 8.

This allows the amount of $NO_2$ within the flue gases emerging from the cooler 24 and supplied to the $CO_2$ capture unit 14 to be very low (in contrast, because of the above reaction, the amount of NO increases).

Then, when the flue gases 8 pass through the $CO_2$ capture unit 14, in addition to $CO_2$, $NO_2$ is also removed from the flue gases, such that the amount of $NO_2$ within the flue gases 8 discharged into the atmosphere is very low.

In order to also reduce the amount of NO within the flue gases, an oxidizer is added within the flue gases 8, in order to make the NO react with it and form $NO_2$; this additional $NO_2$ is not troubling because (as already explained) it is removed from the flue gases 8 during their treatments before discharging.

In this respect the oxidizer is preferably provided upstream of and/or within the cooler 24; in other words an oxidizer is made to react with the NO of the flue gases.

Figure 3:
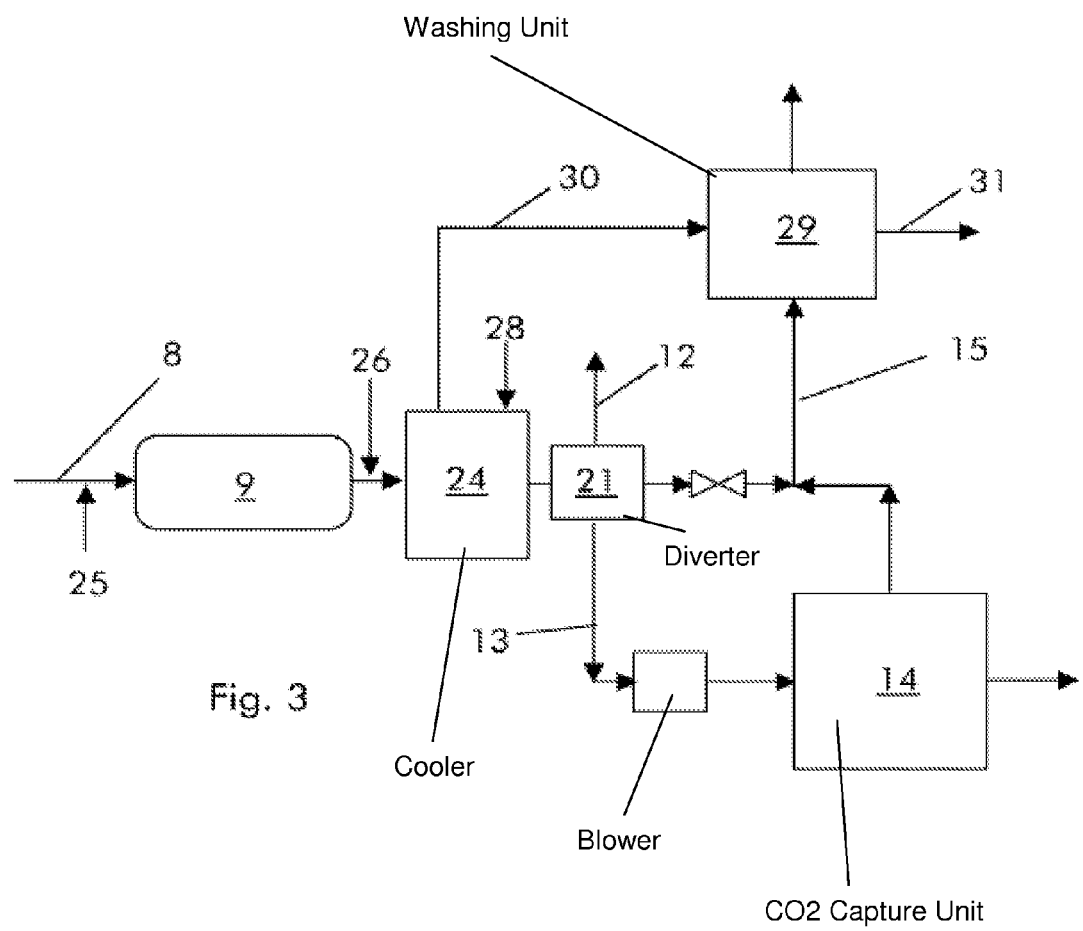
FIG. 3 is a schematic view of a portion of a power plant in a preferred embodiment of the invention.

FIG. 3 shows an example in which the oxidizer is added upstream of the boiler 9 (at position 25), in this case the oxidizer is preferably a gaseous oxidizer such as $O_2$, ozone, etc.

In addition, the oxidizer may also be introduced into the flue gases 8 at position 26 (i.e. between the boiler 9 and the cooler 24); in this case both liquid and gaseous oxidizer are can be used.

Moreover, the oxidizer may also be supplied at position 28 at the top of the cooler 19 (it is a shower cooler); this solution is preferred for a liquid oxidizer.

Naturally one or combinations of the proposed solutions to make the oxidizer interact with the flue gases can be used.

In case the $CO_2$ capture plant is a chilled ammonia based capture plant, a further synergic effect can be achieved.

In fact, typically, when a chilled ammonia $CO_2$ capture plant is used, usually a fraction of the ammonia is drawn from the flue gases 8 and must be recuperated in a washing unit 29 by using sulphuric acid.

Advantageously, the nitric acid $HNO_3$ gathered at the cooler 24 is supplied (via a line 30) to the washing unit 29 to neutralise the ammonia. This allows a further synergic effect to be achieved and the costs to be further reduced. The wasted water in then discharged from the washing unit 29 via a line 31.

Naturally, according to the needs the cooler 24 may also be provided between the diverter 21 and the pump 23.

Naturally, the features described may be independently provided from one another.

In practice, the materials used and the dimensions can be chosen at will according to requirements and to the state of the art.

REFERENCE NUMBERS 1 gas turbine unit
2 compressor of 1
3 combustion chamber of 1
4 turbine of 1
6 mixture
7 fresh air
8 flue gases
9 boiler
10 steam turbine unit
12 recirculated flow
13 discharged flow
14 $CO_2$ capture unit
15 flue gas discharging
16 $CO_2$ storing
18 cooler
19 cooler
20 power plant
21 diverter
22 compressor
23 compressor
24 cooler
25, 26, 28 oxidizer injection
29 washing unit
30 line
31 line

What is claimed is:

1. A power plant, comprising:
   a gas turbine unit adapted to feed flue gases into a boiler of a steam turbine unit, to be then diverted into a recirculated flow that is mixed with fresh air forming a mixture that is fed into a gas turbine unit compressor and a discharged flow that is fed into a $CO_2$ capture unit, the $CO_2$ capture unit being an amine based or chilled ammonia based $CO_2$ capture unit;
   a cooler for the flue gases, the cooler being a shower cooler located upstream of the $CO_2$ capture unit; and
   wherein the $CO_2$ capture unit is a chilled ammonia based capture plant comprising a washing unit to neutralize ammonia drawn by the flue gases, wherein the washing unit is fed with nitric acid gathered at the cooler.

2. The power plant of claim 1, wherein an oxidizer is provided to the flue gases upstream of and/or within the cooler.

3. The power plant of claim 1, wherein the cooler is provided downstream of the boiler and upstream of a diverter that diverts the flue gases into the recirculated flow and the discharged flow.

4. The power plant of claim 1, wherein the boiler is a reheat boiler.

5. The power plant of claim 1, wherein the cooler is upstream of a diverter that diverts the flue gases into the recirculated flow and the discharged flow.

6. The power plant of claim 5, comprising:
an oxidizer that is positioned between the boiler and the cooler.

7. The power plant of claim 5, comprising a liquid oxidizer positioned at a top of the cooler.

8. The power plant of claim 1, wherein the cooler is configured such that flue gases rise from a bottom of a casing of the cooler and a cooling liquid falls from a top of the casing of the cooler.

9. A method for operating a power plant comprising a gas turbine unit adapted to feed flue gases into a boiler of a steam turbine unit, the method comprising:
diverting the flue gases into a recirculated flow and a discharged flow,
mixing the recirculated flow with fresh air forming a mixture,
feeding the mixture into a gas turbine unit compressor,
feeding the discharged flow into a $CO_2$ capture unit,
operating the $CO_2$ capture unit as an amine based or chilled ammonia based $CO_2$ capture unit, wherein the $CO_2$ capture unit is a chilled ammonia based capture plant comprising a washing unit to neutralize ammonia drawn by the flue gases,
cooling the flue gases in a cooler, the cooler being a shower cooler located upstream of the $CO_2$ capture unit, and
feeding the washing unit with nitric acid gathered at the cooler.

10. The method of claim 9, wherein the cooler is upstream of a diverter that diverts the flue gases into the recirculated flow and the discharged flow.

11. The method of claim 9, comprising:
providing an oxidizer between the boiler and the cooler.

12. The method of claim 9, comprising:
providing a liquid oxidizer positioned at a top of the cooler.

13. The method of claim 9, wherein the cooler is configured such that flue gases rise from a bottom of a casing of the cooler and a cooling liquid falls from a top of the casing of the cooler.

14. The method of claim 9, further comprising providing an oxidizer to the flue gases upstream of and/or within the cooler.

* * * * *